Oct. 25, 1938.                H. H. KERR                2,134,560
                         ELECTRICAL APPARATUS
                          Filed May 22, 1937
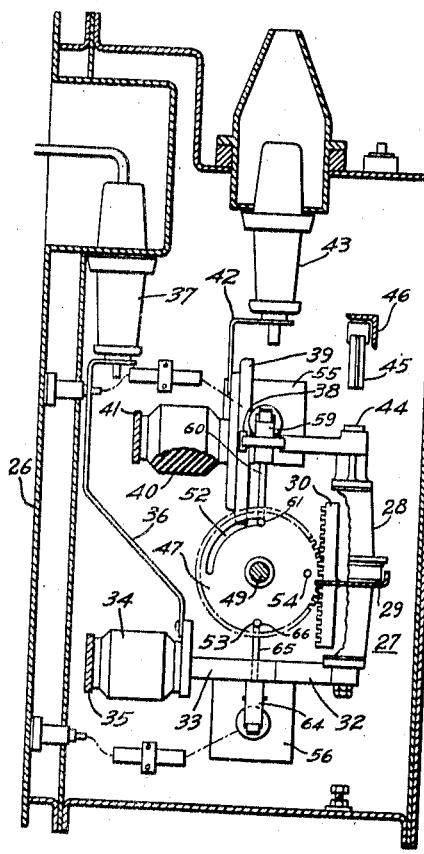
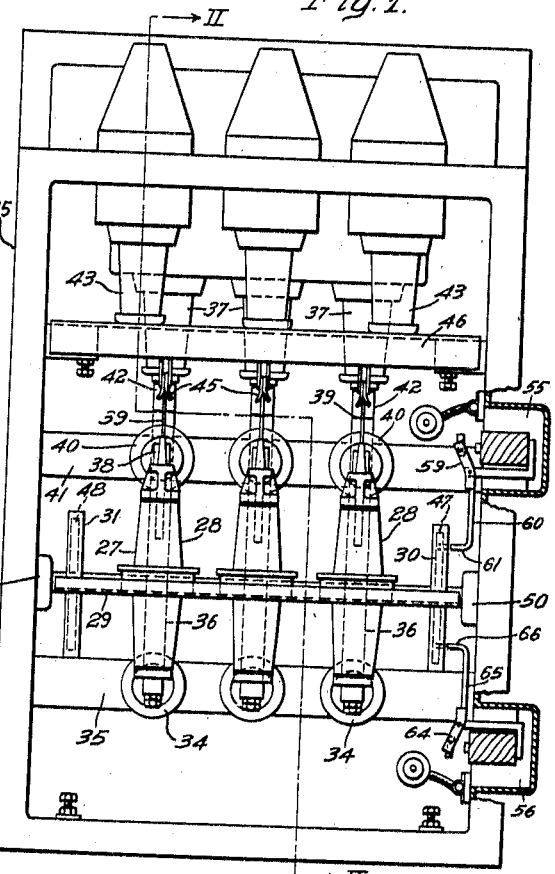
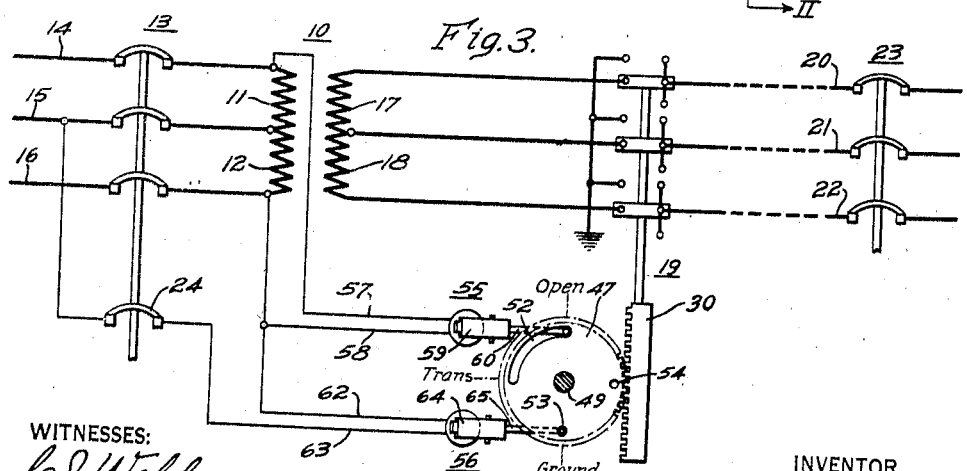
WITNESSES:
INVENTOR
Henry H. Kerr.
BY
ATTORNEY Patented Oct. 25, 1938

2,134,560

UNITED STATES PATENT OFFICE 2,134,560

ELECTRICAL APPARATUS

Henry H. Kerr, Toledo, Ohio, assignor to Westinghouse Electric & Manufacturing Company, East Pittsburgh, Pa., a corporation of Pennsylvania Application May 22, 1937, Serial No. 144,165

11 Claims. (Cl. 171—97)

This invention relates to electrical apparatus and particularly to grounding switches.

In the operation of electrical apparatus such as transformers, different types of grounding switches have been developed for insuring a movement of the switch to connect the power line to the transformer before grounding the power line. Thus, if the power line is alive and the transformer is so energized that an associated interlock locks the switch member and prevents further movement of the switch member to the ground position.

The different types of grounding switches developed for such use, however, do not permit an inspection of the transformer when the transformer is connected to the power line but not connected in the network. This is a serious disadvantage since in many cases a plurality of transformers are connected to the same high voltage feeder cable and in order to ground the power line it is necessary to deenergize the feeder cable and all the transformers connected to it.

An object of this invention is to provide a switch for connecting a power source to the windings of an electrical apparatus or to ground and for disconnecting them therefrom while providing for preventing the operation of the switch to its ground position when the apparatus is energized, although permitting free movement of the switch between the apparatus and disconnect position when the apparatus is connected to and energized only by the power source.

This invention together with other objects will be better understood from the following description when taken in conjunction with the accompanying drawing, in which:

Figure 1 is an elevational view partly in section of a grounding switch and its operating mechanism disposed within a suitable switch casing, the front cover of which is shown removed, Fig. 2 is a sectional view taken along the line II—II of Fig. 1, showing a portion of the operating mechanism and the switch, a part of which is broken away in the illustration; and, Fig. 3 is a schematic view illustrating a three-phase transformer, its primary and secondary circuits and a three-phase grounding switch connected in one of the circuits.

This invention is illustrated as embodied in a circuit in which it is desired to protect an electrical apparatus such as a transformer.

Referring to the drawing and to Fig. 3 in particular, this invention is illustrated as applied to a circuit in which a transformer 10 having low voltage windings 11 and 12 is connected by means of a circuit breaker or line switch 13 to the three conductors 14, 15 and 16 of a low voltage three-phase circuit or network system. The high-voltage windings 17 and 18 of the transformer 10 are connected through a three-phase grounding switch, shown generally at 19, to high voltage feeder conductors 20, 21 and 22 and through the circuit breaker 23 to a high voltage power source, not shown. As illustrated, the line switch 13 also carries an auxiliary switch member 24 for connecting certain of the operating mechanism of the grounding switch 19 in circuit with the low voltage three-phase circuit or network system when the line switch 13 connects the transformer 10 to the network system, as hereinafter described.

In this embodiment the actuating mechanism and switch members of the grounding switch 19 are disposed in the enclosing case 25, as shown in Figs. 1 and 2. The enclosing case 25 is suitable for mounting on the case 26 of a transformer, as shown in Fig. 2, or on a wall. Where it is desired to immerse the switch members and operating mechanism of the switch in oil or other suitable dielectric, the case 25 may be so fabricated as to be leak proof. In this type of structure, a valve, not shown, of suitable construction is usually carried in the bottom of the case for withdrawing the dielectric from the case.

In the embodiment illustrated, the grounding switch 19 is provided with a multiple pole switch member 27, each member of which is carried in a bushing 28 which is suitably mounted on a bushing bridge 29. The ends of the bushing bridge 29 are attached in a suitable manner to racks 30 and 31, respectively, the racks being so mounted in guides, not shown, in the case that they are disposed for reciprocating movement when actuated, as hereinafter described.

As illustrated in Fig. 2, the lower end of each member of the multiple pole switch member 27 is provided with a terminal 32 disposed to slidingly engage a transformer terminal contact member 33 which is carried by an insulating bushing 34. In order to support the bushings 34 and the contact members 33, the bushings are carried by a bushing bridge 35, the ends of which are bolted or otherwise permanently attached to the walls of the case 25. A conductor strap 36 is provided for connecting each of the contact members 33 through the terminal bushing 37 disposed to extend through the transformer case 26 to the windings 17 and 18 of the transformer.

The upper end of each member of the movable

by the armatures 59 and 64, respectively, are withdrawn from the slot and openings in the gear disk 47. The movable switch members 27 may then be moved to the ground position by actuating the shaft 49 by any suitable means, such as by an operator's handle, not shown, to cause the gear disk 47 to rotate in a counter-clockwise direction to actuate the racks 30 and 31 to cause the movable switch assembly 27 to move in a vertical direction to the desired position. As the movable switch member 27 is actuated to its ground position, it is noted that the contact members 38 carried by each of the members of the movable switch assembly maintain their sliding engagement with their associated elongated line terminal contacts 39.

For the purpose of explaining the operation of the grounding switch of this invention, it may be assumed that the movable switch assembly 27 is in its disconnect or open position, in which position it does not bridge a plurality of contacts or close a circuit. With the multiple pole switch member 27 in this position, if it is desired to ground the power line, the shaft 49 may be rotated in a counter-clockwise direction to cause a movement of the switch member 27 in a vertical direction toward its ground position, as explained hereinbefore. If, however, the circuit breaker 23 should be closed when the switch member 27 is in the open position, then the switch member 27 could be actuated to only the transformer position since the energized interlock with its inwardly turned end 61 in the slot 52 prevents movement beyond the transformer position, as explained hereinbefore. If, in addition to the circuit breaker 23, the line switch 13 is also closed to connect the transformer to the conductors of the network system when the switch member 27 is in the open position, then the interlock 56 is so energized that the inwardly turned end 66 of its armature 64 enters the opening 54 to prevent movement of the gear disk from the open position.

By reason of the plurality of interlocks 55 and 56, it is seen that movement of the switch members 27 to either the open or the ground position is prevented when the switch member is in the transformer position and the line switch 13 and the circuit breaker 23 are closed. However, if line switch 13 is open and circuit breaker 23 only is closed to energize the transformer 10, then the interlock 55 only is energized to limit the movement of the gear disk 47. Because of the shape of the slot and its position in the gear disk, as explained hereinbefore, free movement of the switch member 27 may be had when the transformer 10 is connected only to the power line to permit movement of the switch member between the transformer and open position and reverse only. The switch member may be moved from the transformer to the open position without serious damage to the contacts since the only current to be opened is the magnetizing current in the transformer. Although not illustrated, it is desirable to provide a suitable quick-break mechanism in conjunction with the transformer terminal contacts 33 to aid in opening the circuit as the switch members 27 move to the open position. Further movement of the switch members 27 from the transformer position to the ground position may be had only after circuit breaker 23 and line switch 13 are opened to deenergize the transformer 10 and the windings of interlocks 55 and 56.

As illustrated in Figs. 1 and 2 of the drawing, the movable switch members 27 and their associated transformer terminal contact members 33, line terminal contact members 39 and ground contact members 45 are so positioned that the movable switch members 27 must move progressively from an open position through transformer position to the ground position. Positive means are thus provided for insuring movement of the switch members 27 to the transformer position before being actuated to the ground position. Although not illustrated the operating handle usually provided on the shaft 49, carrying the gear disk 47, is provided with means for securing a positive stop of the operating mechanism in the transformer position. This provides a time element in which the windings of interlocks 55 and 56 may be energized if the transformer 10 is connected to the power line or to the conductors of the network system.

It is thus evident that with the grounding switch of this invention the feeder cannot be grounded until after the transformer is deenergized or disconnected from the network system. It is further evident that the desired movement of the movable switch assembly to the transformer position before entering ground position from a disconnect or open circuit position is attained without the aid of mechanical interlocks.

Further advantages are obtained in the grounding switch of this invention in that a free movement of the movable switch members between the transformer and open positions is obtained when the transformer is connected only to the power line, thus permitting inspection of the transformer without necessitating the deenergization of the feeder cable and all of the transformers connected to it. It is thus possible when the line switch connecting the transformer to the network system is in the open position to actuate the switch members between the transformer and open positions regardless of whether the feeder is energized, and to actuate the switch members from transformer position to ground position, provided the transformer 10 is disconnected from the power line. With the grounding switch of this invention it is, therefore, possible to move the switch members to the open position, opening the magnetizing current of the transformer but preventing movement of the switch members to open the load current.

Although this invention has been described with reference to a particular embodiment thereof, other and various modifications are possible. It is, therefore, not to be restricted except insofar as necessitated by the prior art and the scope of the appended claims.

I claim as my invention:

1. In a grounding switch interposed between a power line and transformer and associated with a line switch provided for connecting the transformer to a network system in combination, a multiple pole switch member disposed to be actuated progressively to the positions open, transformer and ground and reverse, means operable with the switch member and responsive to the energization of the transformer for limiting the movement of the switch member to the transformer and open positions when the transformer is connected only to an energized power line, and means operable when the line switch connects the transformer to the network system for locking the switch member against movement.

2. In a grounding switch interposed between a power line and transformer and associated with a line switch provided for connecting the transformer to a network system in combination, a multiple pole switch member disposed to be actuated progressively to the positions open, transformer and ground and reverse, means operable with the switch member and responsive to the energization of the transformer when the transformer is connected only to an energized power line for permitting free movement of the switch member between transformer and open positions but preventing movement of the switch member from transformer to ground positions, and means operable when the line switch connects the transformer to the network system for locking the switch member against movement.

3. In a grounding switch interposed between a power line and transformer and associated with a line switch provided for connecting the transformer to a network system in combination, a multiple pole switch member disposed to be actuated progressively to the positions open, transformer and ground and reverse, a disk having a plurality of openings therein associated with the switch member, means responsive to the energization of the transformer when the transformer is connected only to an energized power line disposed to enter one of the openings in the disk for cooperating with the disk to permit free movement of the switch member between transformer and open positions and to prevent movement of the switch member from transformer to ground positions, and means operable when the line switch connects the transformer to the network system for cooperating with the disk to lock the switch member against movement.

4. In a grounding switch interposed between a power line and transformer and associated with a line switch provided for connecting the transformer to a network system in combination, a multiple pole switch member disposed to be actuated progressively to the positions open, transformer and ground and reverse, a disk having a plurality of openings therein associated with the switch member, means responsive to the energization of the transformer when the transformer is connected only to an energized power line disposed to enter one of the openings in the disk for cooperating with the disk to permit free movement of the switch member between transformer and open positions and to prevent movement of the switch member from transformer to ground positions, and means disposed to be energized when the line switch connects the transformer to the network system to enter any one of the openings in the disk depending upon the position of the switch member to lock the switch member against movement.

5. In a grounding switch interposed between a power line and transformer and associated with a line switch provided for connecting the transformer to a network system in combination, a multiple pole switch member disposed to be actuated progressively to the positions open, transformer and ground and reverse, means operable with the switch member and responsive to the energization of the transformer for limiting the movement of the switch member to the transformer and open positions when the transformer is connected only to an energized power line, said means comprising a disk having an elongated slot extending from the open position to the transformer position when the switch member is in the transformer position and an electromagnetically controlled pin associated therewith responsive to the energization of the transformer when connected only to an energized power line to enter the slot and prevent the movement of the switch member from the transformer position to the ground position while permitting free movement of the switch member between the transformer and open positions, and means operable when the line switch connects the transformer to the network system for cooperating with the disk to lock the switch member against movement.

6. In a grounding switch interposed between a power line and transformer and associated with a line switch provided for connecting the transformer to a network system in combination, a multiple pole switch member disposed to be actuated progressively to the positions open, transformer and ground and reverse, means operable with the switch member and responsive to the energization of the transformer for limiting the movement of the switch member to the transformer and open positions when the transformer is connected only to an energized power line, said means comprising a disk having an elongated slot extending from the open position to the transformer position when the switch member is in the transformer position and an electromagnetically controlled pin associated therewith responsive to the energization of the transformer when connected only to an energized power line to enter the slot and prevent the movement of the switch member from the transformer position to the ground position while permitting free movement of the switch member between the transformer and open positions, the disk also having openings therein at each of the transformer and ground positions when the switch member is in the open position, and means operable when the line switch connects the transformer to the network system for entering any one of the slots or openings in the disk depending upon the position of the switch member for cooperating therewith to lock the switch member against movement.

7. In a grounding switch interposed between a power line and transformer and associated with a line switch provided for connecting the transformer to a network system in combination, a multiple pole switch member disposed to be actuated progressively to the positions open, transformer and ground and reverse, means operable with the switch member and responsive to the energization of the transformer for limiting the movement of the switch member to the transformer and open positions when the transformer is connected only to an energized power line, said means comprising a disk having an elongated slot extending from the open position to the transformer position when the switch member is in the transformer position and an electromagnetically controlled pin associated therewith responsive to the energization of the transformer when connected only to an energized power line to enter the slot and prevent the movement of the switch member from the transformer position to the ground position while permitting free movement of the switch member between the transformer and open positions, the disk also having openings therein at each of the transformer and ground positions when the switch member is in the open position, and means comprising an electromagnetically controlled pin operable when the line switch connects the transformer to the network system for entering any one of the slots or openings in the disk depending upon the position of the switch member for cooperating therewith to lock the switch member against movement.

8. In combination, a transformer, a power line, a grounding switch interposed between the power line and the transformer, a network system, a line switch disposed for connecting the transformer to the network, the grounding switch being also associated with the line switch, the grounding switch comprising a multiple pole switch member having an open, transformer and ground position and being disposed to be actuated progressively to said positions and reverse, means operable with the switch member and responsive to the energization of the transformer for limiting the movement of the switch member to the transformer and open positions when the transformer is connected only to an energized power line, and means operable when the line switch connects the transformer to the network system for locking the switch member against movement.

9. In combination, a transformer, a power line, a grounding switch interposed between the power line and the transformer, a network system, a line switch disposed for connecting the transformer to the network, the grounding switch being also associated with the line switch, the grounding switch comprising a multiple pole switch member having an open, transformer and ground position and being disposed to be actuated progressively to said positions and reverse, means operable with the switch member and responsive to the energization of the transformer when the transformer is connected only to an energized power line for permitting free movement of the switch member between transformer and open positions but preventing movement of the switch member from the transformer to ground positions, and means operable when the line switch connects the transformer to the network system for locking the switch member against movement.

10. A grounding switch comprising, in combination, a multiple pole switch member having an open, transformer and ground position, means associated with the switch member for actuating it progressively to said open, transformer and ground positions and reverse, and a plurality of means associated with said actuating means for controlling its operation in a predetermined manner, one of said plurality of means disposed to be actuated under predetermined electrical conditions to engage said actuating means for so cooperating therewith as to permit free movement of the switch member between the transformer and open positions but to prevent movement of the switch member from transformer to ground position, another of said plurality of means disposed to be actuated under certain other predetermined electrical conditions for cooperating with the actuating means to lock it against movement thereby preventing movement of the switch member.

11. A grounding switch comprising, in combination, a multiple pole switch member having an open, transformer and ground position and being disposed to be actuated progressively to said positions and reverse, a disk having a plurality of openings therein associated with the switch member, means disposed to be actuated under predetermined conditions to enter one of the openings in the disk for cooperating therewith to permit free movement of the switch member between transformer and open positions and to prevent movement of the switch member from transformer to ground position, and means disposed to be actuated under certain other predetermined conditions for cooperating with the disk to lock the switch member against movement.

HENRY H. KERR.